June 23, 1953  F. H. BUCK  2,642,953
APPARATUS FOR RECOVERING GAS BORNE PARTICLES
Filed Sept. 27, 1949  2 Sheets-Sheet 1

FRANK H. BUCK,
INVENTOR.

BY

FRANK H. BUCK,
*INVENTOR.*

Patented June 23, 1953

2,642,953

UNITED STATES PATENT OFFICE 2,642,953

APPARATUS FOR RECOVERING GAS BORNE PARTICLES

Frank H. Buck, Wilmington, Del., assignor to Atlas Powder Company, Wilmington, Del., a corporation of Delaware Application September 27, 1949, Serial No. 118,017

5 Claims. (Cl. 183—32)

This invention relates to apparatus for solidifying readily fusible materials in powdered to granular form by the process of causing a spray of the said material to flow countercurrent to a stream of cold gas, and more particularly to means for separtaing from the emergent gas of such a process particles of the solidified material which are sufficiently small to be gas borne.

Bulk handling of readily fusible materials such as waxy solids which melt well above ordinary temperatures is facilitated if the materials can be reduced to powdered or granular form. To this end, processes have been developed for preparing such materials in powdered to granular form by spraying them while melted into a cold chamber or by contacting a mist of such material with a stream of cold air or other gas so that the droplets solidify before they are deposited against any solid surface, or coalesce. Exemplary of materials which may be so processed are the higher saturated fatty acids such as palmitic or stearic acid, partial higher saturated fatty acid esters of polyhydroxylic compounds such as sorbitan monostearate, sorbide dipalmitate, glycerol monostearate, and the like.

In the course of carrying out the above described process for preparing powdered to granular materials, there is inevitably formed a considerable quantity of very finely divided material, material so finely divided that it is carried in the countercurrent stream of the cooling gas instead of traveling with the main body of the solid product. For understandable reasons of economy, it is desirable to separate the gas borne particles of solidified materials from the gas stream in recoverable manner.

It is, therefore, an object of the present invention to provide an apparatus for removing fine particles of fusible solids from gas streams.

Another object is to provide apparatus for effecting the recovery of readily fusible solid material from gas streams carrying such material in finely divided condition.

A still further object is to provide means for recovering that portion of spray solidified waxy materials which is sufficiently finely divided to be carried out of the spray tower in the emergent gas stream.

The above and other objects will become apparent from the following description of the invention and the appended claims.

The objects of the present invention are accomplished by projecting gas containing suspended, readily fusible solid particles, such, for example, as the emergent gases from a spray solidifying tower at high velocity through a chamber or conduit in which there is interposed an impingement plate at right angles to the direction of gas flow, said plate being maintained at a temperature well above the melting point of the material being processed in the tower; and providing means to collect the molten material from said plate in recoverable manner.

In the preferred embodiment, the said conduit or chamber is so arranged that the gas stream traverses it in a horizontal direction, the impingement plate being mounted vertically and at right angles to the direction of gas flow. The preferred method of collecting the drippings from the said plate comprises a pan or trough positioned immediately below the plate and provided with heating means to maintain the material drained therefrom in a molten condition and further provided with means for drawing off the collected drainings for recovery. The drawings illustrate the invention in terms of such preferred arrangement.

Figure 1:
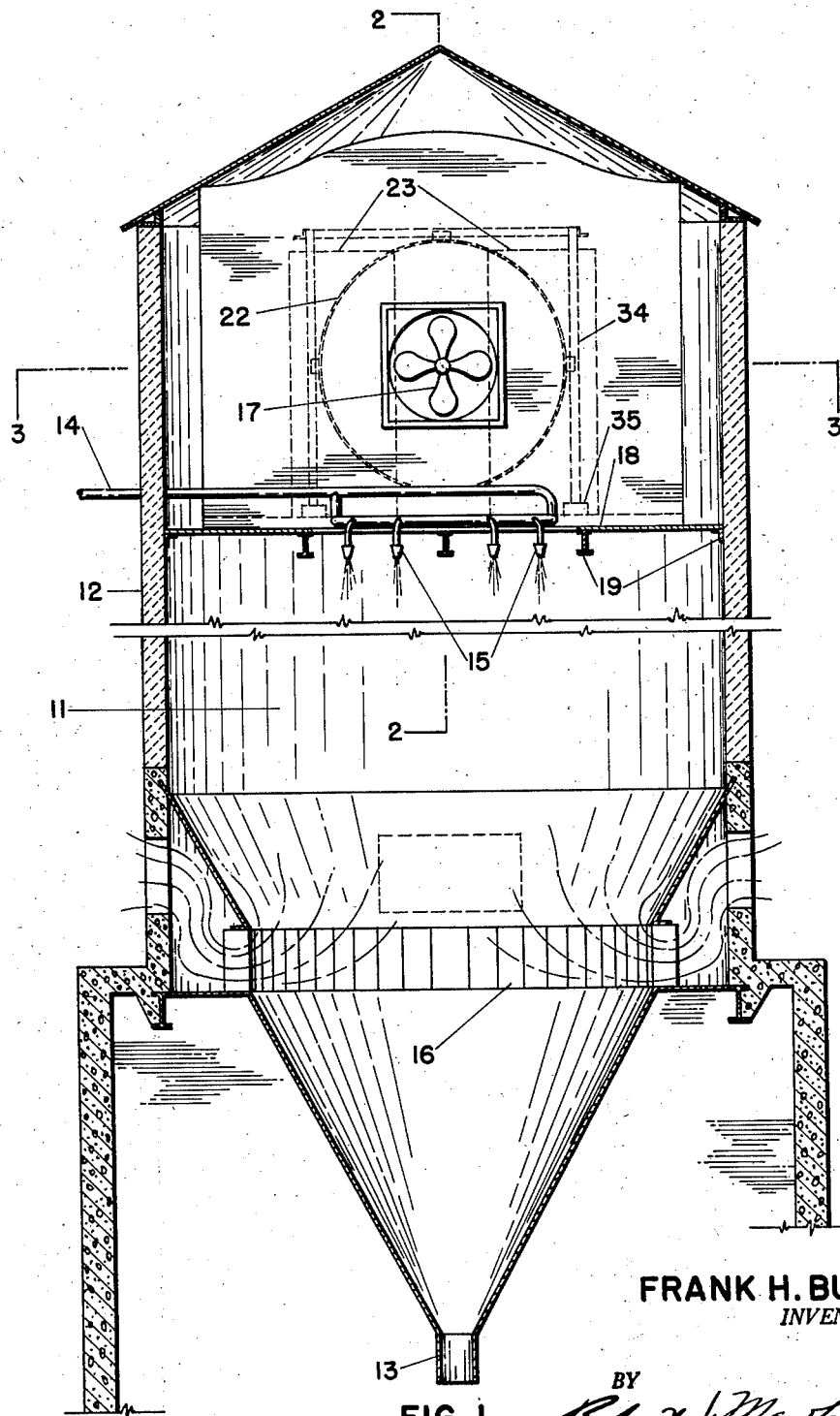
Figure 1 is a vertical section taken through a spray cooling tower equipped with the device of the present invention, portions of the tower body and base being broken away.
Figure 2:
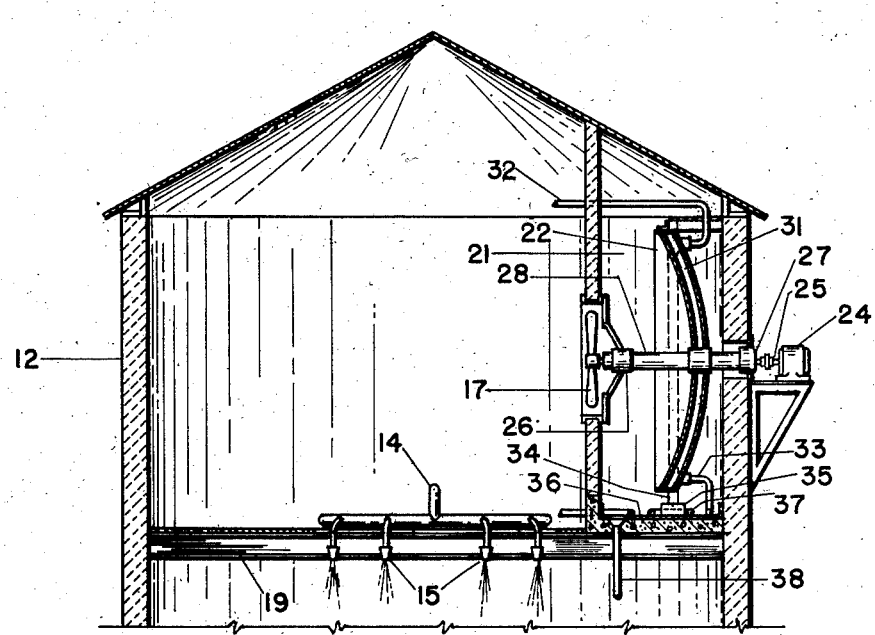
Figure 2 is a vertical section of the upper portion of the same tower and device taken along the line 2—2 of Figure 1.
Figure 3:
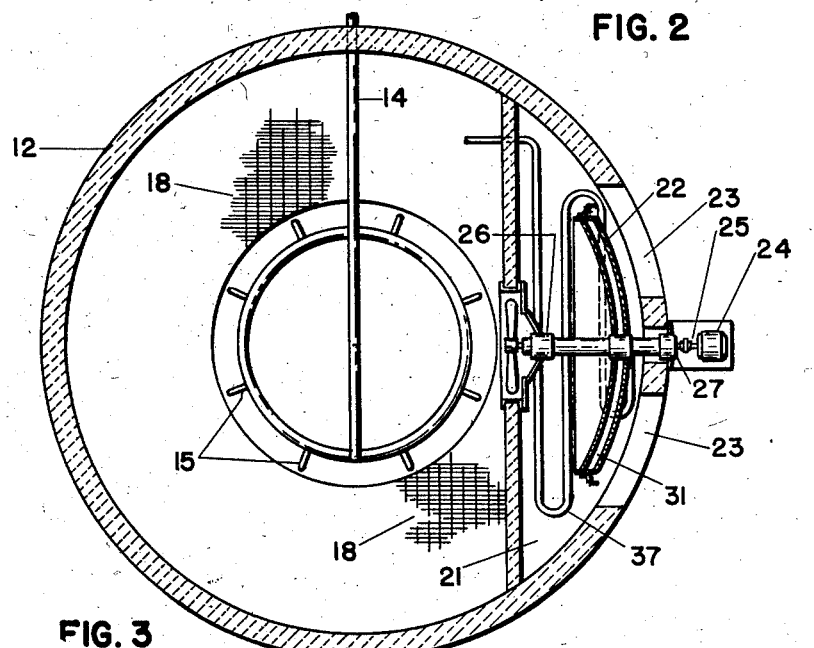
Figure 3 is a horizontal section taken along the line 3—3 of Figure 1.

In the drawings, where corresponding parts are designated by the same reference numerals, 11 is a conventional tower for spray solidification of low melting waxy materials comprising a cylindrical shell 12, the lower portion of which is tapered in cone shape to opening 13 through which the solidified granular product is discharged. In the upper portion of the tower a grating floor 18 rests on beams 19, said floor supporting the equipment for introducing the material to be treated and for recovering gas borne particles as described in more detail below.

The molten material to be processed enters the tower from a storage reservoir not shown, by way of jacketed pipe 14 and through spray nozzles 15 which may be set to atomize the stream of fluid to any desired degree of fineness.

Cold air enters the tower through louvers 16 near the base of the tower, is drawn upward, countercurrent to the falling spray droplets, by suction fan 17, and is blown horizontally into chamber 21 against impingement plate 22 finally being discharged through ports 23. The opening in which suction fan 17 operates, and through which chamber 21 communicates with tower 11, is small in cross section relative to the cross sectional area of tower 11, with the result that the particle laden gas stream is projected into the chamber and against impingement plate 22 at high velocity.

The fan 17 may be driven by any suitable means, exemplified in the drawings by motor 24 and shaft 25 which latter passes through the impingement plate and is suitably journaled by bearings at 26 and 27. A cylindrical housing 28 about the shaft prevents deposit of gas borne solids thereon.

Impingement plate 22, is here shown as presenting a concave surface to the advancing air stream, which is the preferred construction, and is maintained at a temperature above the melting point of the material being processed in the tower as, for example, by means of steam jacket 31 into which steam is led by pipe 32 and from which steam and condensate leave by pipe 33. The plate is held in place by a suitable framework 34 the supporting base of which is shown at 35.

Beneath the impingement plate is drip pan 36, to catch molten wax draining from the heated impingement plate. The contents of the drip pan are prevented from solidifying by maintenance of an elevated temperature as, for example, by passing steam through coils 37 positioned therein. In the embodiment illustrated exhaust steam and condensate from the jacket 31 is utilized in coils 37. The molten contents of the pan are drawn off continually or periodically as may be preferred through the steam jacketed pipe 38.

By means of the arrangement illustrated particles of the solidified waxy product being processed, which are too small to fall against the upward force of the air stream, are directed against the heated plate where they melt, coalesce into a film, and drip from the lower edge of said plate into a container from whence they can be recovered.

Obvious modifications of structural details of the illustrated embodiment will suggest themselves to those skilled in the art said modifications being included within the purview of the present invention which is limited only by the scope of the appended claims.

It will be appreciated, furthermore, that the invention is not limited to specific dimensional relations between the component parts. It will be obvious to those skilled in the art that any portion of the gas stream which does not impinge upon the plate may carry gas borne solidified particles through the exhaust ports where their recovery will be impossible. Accordingly, it is preferred that the said gas stream be constricted as by passing through the opening for the suction fan 17 in the drawing and that the impingement plate be larger in area than the constricted stream. This has the further effect of increasing the velocity of said gas stream and of hurling the gas borne particles positively against impingement plate 22. By way of illustration and not by way of limitation it has been found that a circular dished plate 8 feet in diameter at the rim placed approximately 3 feet from a 36 inch exhaust fan in a chamber essentially 10 feet square in cross section, efficiently removes gas borne solidified wax particles from an air stream of 20,000 to 25,000 cu. feet per minute.

Having fully described and illustrated the invention, what is claimed is:

1. Apparatus for recovering readily fusible solid material from a gas stream carrying such material in finely divided form which comprises a chamber with a gas inlet and outlet, an impingement plate larger than the cross-sectional area of said gas stream within said chamber, means for maintaining said impingement plate at a temperature above the melting point of said material, means for recoverably collecting molten material from said impingement plate, means for projecting said gas stream at high velocity into said chamber and against the face of the said plate.

2. Apparatus for recovering readily fusible solid material from a gas stream carrying such material in finely divided form which comprises a chamber with a gas inlet and outlet, a vertically disposed impingement plate larger than the cross-sectional area of said gas stream within said chamber, means for maintaining said plate at a temperature above the melting point of said material, means for recoverably collecting molten material from said impingement plate, and means for projecting said gas stream at high velocity horizontally into said chamber and against the face of said plate.

3. Apparatus as in claim 2 wherein the said collecting means comprises a pan-shaped vessel disposed beneath the said vertical impingement plate, said vessel being provided with heating means whereby the collected contents are maintained in molten condition.

4. An apparatus as in claim 3 wherein the face of the impingement plate is concave toward the direction of flow of the said gas stream.

5. Apparatus for recovering readily fusible solid material from a gas stream carrying such material in finely divided form which comprises a chamber with a gas inlet and outlet, an impingement plate larger than the cross-sectional area of said gas stream within said chamber, means for maintaining said plate at a temperature above the melting point of said material; means for projecting said gas stream at high velocity into said chamber and against the face of said plate; and heated means for recoverably collecting molten material from said plate.

FRANK H. BUCK.

References Cited in the file of this patent

UNITED STATES PATENTS

| Number | Name | Date |
|---|---|---|
| 1,599,490 | Richter et al. | Sept. 14, 1926 |
| 1,837,869 | Jewett et al. | Dec. 22, 1931 |
| 1,969,986 | McGrail | Aug. 14, 1934 |

FOREIGN PATENTS

| Number | Country | Date |
|---|---|---|
| 622,850 | Germany | Dec. 7, 1935 |
| 562,394 | Great Britain | June 29, 1944 |